United States Patent
Bauknecht et al.

(10) Patent No.: US 8,398,522 B2
(45) Date of Patent: *Mar. 19, 2013

(54) MULTI-STAGE GEARBOX

(75) Inventors: Gert Bauknecht, Friedrichshafen (DE); Gerhard Gumpoltsberger, Friedrichshafen (DE); Peter Ziemer, Tettnang (DE); Mark Mohr, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 301 days.

This patent is subject to a terminal disclaimer.

(21) Appl. No.: 12/919,350

(22) PCT Filed: Feb. 4, 2009

(86) PCT No.: PCT/EP2009/051228
§ 371 (c)(1),
(2), (4) Date: Aug. 25, 2010

(87) PCT Pub. No.: WO2009/106409
PCT Pub. Date: Sep. 3, 2009

(65) Prior Publication Data
US 2011/0009229 A1    Jan. 13, 2011

(30) Foreign Application Priority Data

Feb. 28, 2008  (DE) .......................... 10 2008 000 429

(51) Int. Cl.
*F16H 3/62* (2006.01)
(52) U.S. Cl. ...................................... 475/275
(58) Field of Classification Search .................. 475/275, 475/277, 282, 276, 280, 903
See application file for complete search history.

(56) References Cited

U.S. PATENT DOCUMENTS 4,395,925 A    8/1983 Gaus
(Continued)

FOREIGN PATENT DOCUMENTS

DE    29 36 969 A1    4/1981
DE    199 12 480 A1    9/2000
(Continued)

OTHER PUBLICATIONS

Gumpoltsberger, Gerhard: Systematic Synthesis and Evaluation of Multi-Stage Planetary Transmissions, Dissertation TU Chemnitz, 2007.

(Continued)

*Primary Examiner* — Justin Holmes
*Assistant Examiner* — Stacey Fluhart
(74) *Attorney, Agent, or Firm* — Davis & Bujold, PLLC (57) ABSTRACT

A multi-stage transmission comprising planetary gearsets (P1, P2, P3, P4), shafts, and shift elements. Gearsets (P1, P2) form a front-mounted gear gearset and gearsets (P3, P4) form a main gearset. The carriers of gearsets (P1, P2) are coupled via shaft (4) which couples a main gearset element. The ring gear of gearset (P1) couples the sun gear of gearset (P2) via shaft (8) that couples drive shaft (1) via clutch (18). The sun gear of gearset (P1) couples housing (G) by shaft (3) via brake (03), and shaft (1) via clutch (13). The ring gear of gearset (P2) couples housing (G) by shaft (5) via brake (05). Shaft (7) couples main gearset element, and, via brake (07), housing (G). Shaft (6) couples another main gearset element and, via clutch (16), shaft (1). The output shaft couples a further main gearset element.

14 Claims, 4 Drawing Sheets

U.S. PATENT DOCUMENTS

| | | | |
|---|---|---|---|
| 5,106,352 | A | 4/1992 | Lepelletier |
| 6,558,287 | B2 | 5/2003 | Hayabuchi et al. |
| 6,572,507 | B1 | 6/2003 | Korkmaz et al. |
| 6,634,980 | B1 | 10/2003 | Ziemer |
| 6,860,831 | B2 | 3/2005 | Ziemer |
| 6,955,627 | B2 | 10/2005 | Thomas et al. |
| 6,960,149 | B2 | 11/2005 | Ziemer |
| 6,991,578 | B2 | 1/2006 | Ziemer |
| 7,549,942 | B2 | 6/2009 | Gumpoltsberger |
| 7,556,582 | B2 | 7/2009 | Gumpoltsberger |
| 7,566,283 | B2 | 7/2009 | Gumpoltsberger |
| 7,699,743 | B2 | 4/2010 | Diosi et al. |
| 8,043,190 | B2 * | 10/2011 | Phillips ..................... 475/276 |
| 8,210,981 | B2 * | 7/2012 | Bauknecht et al. ........... 475/275 |
| 2008/0161149 | A1 | 7/2008 | Diosi et al. |
| 2009/0011891 | A1 | 1/2009 | Phillips et al. |
| 2010/0048344 | A1 | 2/2010 | Kamm et al. |
| 2011/0009228 | A1 | 1/2011 | Bauknecht et al. |

FOREIGN PATENT DOCUMENTS

| | | |
|---|---|---|
| DE | 199 49 507 A1 | 4/2001 |
| DE | 101 15 983 A1 | 10/2002 |
| DE | 101 15 987 A1 | 10/2002 |
| DE | 101 15 995 A1 | 10/2002 |
| DE | 102 13 820 A1 | 10/2002 |
| DE | 10 2004 040 597 A1 | 2/2006 |
| DE | 10 2005 010 210 A1 | 9/2006 |
| DE | 10 2005 032 881 A1 | 1/2007 |
| DE | 10 2006 006 622 A1 | 9/2007 |
| DE | 10 2006 006 636 A1 | 9/2007 |
| DE | 10 2006 006 637 A1 | 9/2007 |
| DE | 10 2008 000 428 | 2/2008 |
| DE | 10 2008 016 084 A1 | 10/2008 |
| EP | 0 434 525 A1 | 6/1991 |
| JP | 2005061445 A | 3/2005 |
| JP | 2006349153 A | 12/2006 |

OTHER PUBLICATIONS

Gumpoltsberger, Gerhard: Synthesis of Planetary Transmissions, ZF Friedrichshafen AG, 2009, 13 pages, Germany.

* cited by examiner

| GEAR | BRAKE 03 | BRAKE 05 | CLUTCH 13 | CLUTCH 16 | CLAW 07 | CLAW 18 | GEAR RATIO $\lambda$ | STEP $\varphi$ |
|---|---|---|---|---|---|---|---|---|
| 1 |   | o |   |   | o | o | 4.61 |  |
| 2 | o |   |   |   | o | o | 2.87 | 1.61 |
| 3 |   |   | o |   | o | o | 1.84 | 1.56 |
| 4 |   |   |   | o | o | (o) | 1.36 | 1.36 |
| 5 |   |   | o | o | o |   | 1.00 | 1.36 |
| 6 | o |   |   | o | o |   | 0.79 | 1.26 |
| 7 |   | o |   | o | o |   | 0.69 | 1.14 |
| 8 | o | o |   | o |   |   | 0.58 | 1.20 |
| 9 |   | o | o | o |   |   | 0.46 | 1.25 |
| R |   | o | o |   |   | o | -3.15 | TOTAL 10.0 |

| GEAR | BRAKE | | CLUTCH | | CLAW | | GEAR RATIO λ | STEP φ |
|---|---|---|---|---|---|---|---|---|
| | 03 | 05 | 13 | 16 | 07 | 18 | | |
| 1 | | o | | | o | o | 5.17 | |
| 2 | o | | | | o | o | 3.21 | 1.61 |
| 3 | | | o | | o | o | 2.07 | 1.56 |
| 4 | | | | o | o | (o) | 1.39 | 1.48 |
| 5 | | | o | o | | o | 1.00 | 1.39 |
| 6 | o | | | o | | o | 0.83 | 1.21 |
| 7 | | o | | o | | o | 0.74 | 1.12 |
| 8 | o | o | | o | | | 0.63 | 1.17 |
| 9 | | o | o | o | | | 0.52 | 1.22 |
| R | | o | o | | o | | -3.53 | TOTAL 10.0 |

Fig. 8

MULTI-STAGE GEARBOX

This application is a National Stage completion of PCT/EP2009/051228 filed Feb. 4, 2009, which claims priority from German patent application serial no. 10 2008 000 429.4 filed Feb. 28, 2008.

FIELD OF THE INVENTION

The present invention relates to a multi-stage transmission of a planetary design, in particular an automatic transmission for a motor vehicle.

BACKGROUND OF THE INVENTION

According to the prior art, automatic transmissions, particularly for motor vehicles, comprise planetary gear sets that are shifted using friction elements or shift elements such as clutches and brakes, and typically are connected to a start-up element, such as a hydrodynamic torque converter or a fluid coupling, that is subject to a slip effect and is provided optionally with a lock-up clutch.

A transmission of this type appears in EP 0 434 525 A1. It mainly comprises a drive shaft and an output shaft, which are disposed parallel to each other, a double planetary gear set disposed concentrically to the output shaft, and five shift elements in the form of three clutches and two brakes, whose selective engagement in pairs determines the different gear ratios between the drive shaft and the output shaft. The transmission has one front-mounted gear set and two power paths so that six forward gears are attained by the selective engagement of pairs of the five shift elements.

Two clutches are required in the first power path for transmitting torque from the front-mounted gear set to two elements of the double planetary gear set. They are disposed in the power flow direction substantially downstream of the front-mounted gear set in the direction of the double planetary gear set. A further clutch is provided in the second power path, which detachably connects the second power path to a further element of the double planetary gear set. The clutches are disposed in such a manner that the inner lamella carrier forms the output drive.

Furthermore, the applicant's DE 199 49 507 A1 makes known a multi-stage transmission, according to which two non-shiftable front-mounted gear sets are provided on the drive shaft and generate two rotational speeds on the output side, which, in addition to the rotational speed of the drive shaft, can be selectively meshed with a shiftable double planetary gear set acting on the output shaft by selective engagement of the shift elements such that only one of the two currently actuated shift elements must be engaged or disengaged to shift from one gear to the next higher or lower gear.

DE 199 12 480 A1 discloses an automatically shiftable motor vehicle transmission having three single-carrier planetary gear sets, as well as three brakes and two clutches, for shifting six forward gears and one reverse gear, and having a drive shaft and an output shaft. The automatically shiftable motor vehicle transmission is designed such that the drive shaft is directly connected to the sun gear of the second planetary gear set and such that the drive shaft can be connected to the sun gear of the first planetary gear set via the first clutch, and/or to the carrier of the first planetary gear set via the second clutch. Additionally or alternatively, the sun gear of the first planetary gear set can be connected to the housing of the transmission via the first brake, and/or the carrier of the first planetary gear set can be connected to the housing via the second brake, and/or to the sun gear of the third planetary gear set via the third brake to the housing.

Furthermore, DE 102 13 820 A1 makes known a multi-speed automatic transmission comprising a first input path T1 of a first transmission ratio; an input path T2 that has a higher transmission ratio than that of input path T1; a planetary gear set with four elements, namely a first element, a second element, a third element, and a fourth element in the sequence of elements in a rotational speed diagram; a clutch C-2 which transfers rotation of the input path T2 to the first element S3; a clutch C-1 which transfers rotation from the input path T2 to the fourth element S2; a clutch C-4 which transfers rotation from the input path T1 to the first element; a clutch C-3 which transfers rotation from the input path T1 to the second element C3; a brake B-1 which produces meshing of the fourth element; a brake B-2 which produces meshing of the second element; and an output element which is coupled to the third element R3.

A multi-stage transmission is described within the scope of the applicant's DE 101 15 983 A1, which has a drive shaft that is connected to a front-mounted gear set, an output shaft that is connected to a rear-mounted gear set, and a maximum of seven shift elements that can be selectively shifted to select at least seven forward gears without group shifting. The front-mounted gear set comprises a front-mounted planetary gear set or at most two non-shiftable front-mounted planetary gear sets coupled to the first -mounted planetary gear set, and the rear-mounted gear set is formed as a two-carrier, four-shaft transmission having two shiftable rear-mounted planetary gear sets, and has four free shafts. The first free shaft of this two-carrier, four-shaft transmission is connected to the first shift element, the second free shaft is connected to the second and third shift elements, the third free shaft is connected to the fourth and fifth shift elements, and the fourth free shaft is connected to the output shaft. For a multi-stage transmission, according to the invention, having a total of six shift elements, it is proposed to connect the third free shaft or the first free shaft of the rear-mounted gear set additionally to a sixth shift element. For a multi-stage transmission, according to the invention, having a total of seven shift elements, it is proposed to connect the third free shaft additionally to a sixth shift element D' and to connect the first free shaft additionally to a seventh shift element.

Furthermore, a multi-stage transmission having at least seven gears is described within the scope of the applicant's DE 101 15 987. This transmission comprises the drive shaft and the output shaft, a non-shiftable front-mounted gear set and a shiftable rear-mounted gear set in the form of a two-carrier, four-shaft transmission. The front-mounted gear set comprises a first planetary gear set which offers, in addition to the input rotational speed of the drive shaft, a second rotational speed that can be selectively connected to a rear-mounted gear set. The rear-mounted gear set comprises two shiftable planetary gear sets which, using the six shift elements, can shift at least seven gears, wherein two power paths are formed. Advantageously, group shiftings are always avoided for every shift procedure.

Furthermore, a nine-speed multi-stage transmission is known from DE 29 36 969; it comprises eight shift elements and four gear sets, wherein one gear set serves as a front-mounted gear set, and the main gearing includes a Simpson set and a further gear set serving as the reverse gear.

Further multi-stage transmissions are known, for example, from the applicant's DE 102004040597 A1, DE 102005010210 A1 and DE 102006006637 A1.

Automatically shiftable vehicle transmissions of a planetary design have been generally described numerous times in the prior art and are continually undergoing further development and improvement. These transmissions should have a relatively simple design, in particular requiring a low number of shift elements, and avoid the need for double shifting when sequential shifting is performed, thereby ensuring that only one shift element is ever switched when shifting is performed in defined groups of gears.

SUMMARY OF THE INVENTION

The object of the present invention is to propose a multi-stage transmission of the initially described type, which has at least nine forward gears and at least one reverse gear having a sufficient transmission ratio, in which the design complexity and the overall size, in particular the overall length and the weight, are optimized, and in which efficiency is improved with respect to drag losses and gearing losses. In addition, in the multi-stage transmission according to the invention, minimal support moments should act on the shift elements. The transmission, according to the invention, should be particularly suited for a front transverse installation.

Accordingly, a multi-stage transmission, according to the invention, of a planetary design is proposed which has an input shaft and an output shaft which are disposed in a housing. In addition, there are provided at least four planetary gear sets which are designated, in the following, as the first, second, third, and fourth planetary gear sets, at least eight rotatable shafts which are designated, in the following, as the drive shaft, output shaft, third, fourth, fifth, sixth, seventh, and eighth shafts, and at least six shift elements comprising brakes and clutches, whose selective engagement produces different transmission ratios between the drive shaft and the output shaft, such that preferably nine forward gears and one reverse gear can be realized.

According to the invention, the first and second planetary gear sets, which are preferably designed as minus planetary gear sets, form a shiftable front-mounted gear set, and the third and fourth planetary gear sets form a main gear set.

According to the invention, in the multi-stage transmission, the carriers of the first and second planetary gear sets are coupled together via the fourth shaft which is connected to an element of the main gear set, the ring gear of the first planetary gear set is coupled to the sun gear of the second planetary gear set via the eighth shaft which is detachably connectable to the drive shaft via a first clutch, the sun gear of the first planetary gear set can be coupled to a housing of the transmission by means of the third shaft, via a first brake, and is detachably connectable to the drive shaft via a second clutch, and the ring gear of the second planetary gear set can be coupled to a housing of the transmission by means of the fifth shaft via a second brake.

According to the invention, the seventh shaft is constantly connected to at least one element of the main gear set, and can be coupled to a housing of the transmission via a third brake, and the sixth shaft is constantly connected to at least one further element of the main gear set and is detachably connectable to the drive shaft via a third clutch; the output shaft is constantly connected at least to a further element of the main gear set.

According to a first embodiment of the invention, the fourth shaft is constantly connected to the ring gear of the third planetary gear set, and the sixth shaft is constantly connected to the ring gear of the fourth planetary gear set and the carrier of the third planetary gear set, and is detachably connectable to the drive shaft via the third clutch. Furthermore, the seventh shaft is constantly connected to the sun gears of the third and fourth planetary gear sets, and can be coupled to a housing of the transmission via the third brake. The output drive is produced via the output shaft that is constantly connected to the carrier of the fourth planetary gear set.

According to an advantageous development of the invention, the main gear set is designed as a Simpson gear set having a common wide sun gear, two carriers, and two ring gears.

Within the scope of a further embodiment of the invention, it is proposed that the fourth shaft is constantly connected to the sun gear of the third planetary gear set, the sixth shaft is constantly connected to the ring gear of the fourth planetary gear set and the carrier of the third planetary gear set, and can be detachably connected to the drive shaft via the third clutch, and the seventh shaft is constantly connected to the sun gear of the fourth planetary gear set, and can be coupled to a housing of the transmission via the third brake. Furthermore, the output shaft is permanently connected to the ring gear of the third planetary gear set and the carrier of the fourth planetary gear set.

According to a third embodiment of the invention, the third and fourth planetary gear sets can be combined or reduced to a Ravigneaux set having a common carrier and a common ring gear.

In this case, the fourth shaft is constantly connected to the first sun gear of the Ravigneaux set, the sixth shaft is constantly connected to the ring gear of the Ravigneaux set, and can be detachably connected to the drive shaft via the third clutch, and the seventh shaft is constantly connected to the second sun gear of the Ravigneaux set, and can be coupled to a housing of the transmission via the third brake. In this embodiment, the output drive is produced via the carrier of the Ravigneaux set.

When the third and fourth planetary gear sets are embodied as a Ravigneaux set, it can be provided as an alternative that the fourth shaft is connected to a sun gear of the Ravigneaux set, and the sixth shaft is connected to the common carrier, and can be detachably connected to the drive shaft via the third clutch. Furthermore, the seventh shaft is constantly connected to a sun gear of the Ravigneaux set, and can be coupled to a housing of the transmission via the third brake, and the output drive is produced via the common ring gear of the Ravigneaux set.

The embodiment of the multi-stage transmission, according to the invention, results in transmission ratios that are particularly suitable for passenger vehicles, and in a significantly greater overall gear ratio of the multi-stage transmission, thereby improving driving smoothness and significantly reducing fuel consumption.

Furthermore, design complexity is significantly reduced with the multi-stage transmission, according to the invention, due to a low number of shift elements. Using the multi-stage transmission according to the invention, it is advantageously possible to perform a start-up using a hydrodynamic converter, an external start-up clutch, or any other suitable external start-up element. It is also conceivable to enable start-up using a start-up element integrated in the transmission. Preferably, a shift element that is actuated in the first forward gear and in the reverse gear is suitable.

Moreover, the multi-stage transmission, according to the invention, results in good efficiency in the main drive gears with respect to drag losses and gearing losses.

Furthermore, low moments are present in the shift elements and in the planetary gear sets of the multi-stage transmission, thereby advantageously reducing wear in the multi-stage transmission. In addition, the low moments make it possible to utilize correspondingly low dimensions, thereby reducing the necessary installation space and related costs. Furthermore, the rotational speeds of the shafts, shift elements, and planetary gear sets are low.

In addition, the transmission according to the invention is designed to allow adaptability to different drive train embodiments in terms of power flow direction and spatial aspects.

BRIEF DESCRIPTION OF THE DRAWINGS

The invention is described in greater detail in the following, as an example, with reference to the attached figures. They show.

DETAILED DESCRIPTION OF THE PREFERRED EMBODIMENTS

Figure 1:
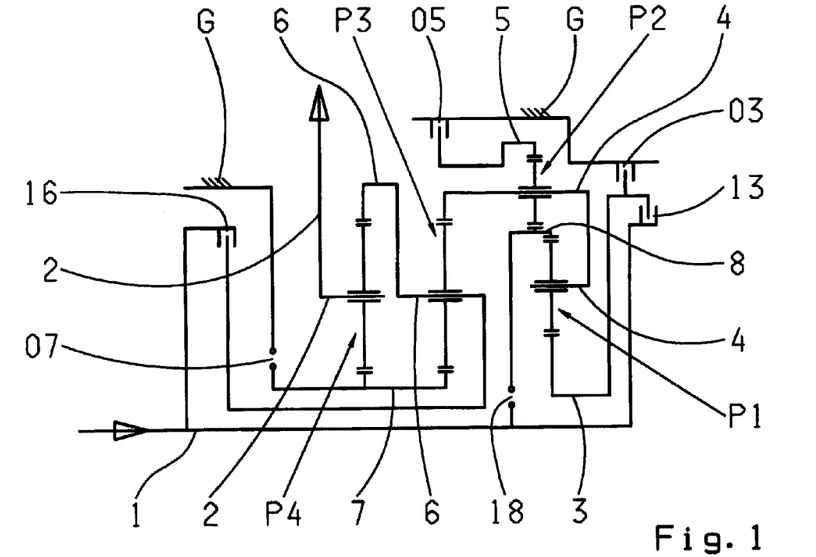
FIG. 1: a schematic view of a preferred embodiment of a multi-stage transmission according to the invention.

FIG. 1 shows a multi-stage transmission, according to the invention, which has a drive shaft 1 and an output shaft 2, which are disposed in a housing G. Four planetary gear sets P1, P2, P3 and P4 are provided, wherein the first and the second planetary gear sets P1, P2, which are preferably designed as minus planetary gear sets, form a shiftable front-mounted gear set, and the third and fourth planetary gear sets P3, P4 form the main gear set.

As shown in FIG. 1, six shift elements are provided, namely three brakes, 03, 05, 07 and three clutches 13, 16, and 18. The spatial disposition of the shift elements can be arbitrary, and is limited only by the dimensions of the outer design.

Selective shifting of nine forward gears and one reverse gear can be realized using these shift elements. The multi-stage transmission, according to the invention, has a total of eight rotatable shafts, namely the shafts 1, 2, 3, 4, 5, 6, 7 and 8.

According to the invention, in the multi-stage transmission according to FIG. 1 the carriers of the first and the second planetary gear sets P1, P2 are coupled together via the shaft 4 which is connected to the ring gear of the planetary gear set P3 of the main gear set, and the ring gear of the first planetary gear set P1 is coupled to the sun gear of the second planetary gear set P2 via the shaft 8 which is detachably connectable to the drive shaft 1 via a clutch 18.

Furthermore, the sun gear of the first planetary gear set P1 can be coupled to a housing G of the transmission by means of the shaft 3 via a brake 03, and can be detachably connected to the drive shaft 1 via a clutch 13, and the ring gear of the second planetary gear set P2 can be coupled to a housing G of the transmission by means of the shaft 5 via a brake 05. The clutch 13 and the brake 03 preferably have a common lamella carrier.

As shown in FIG. 1, the shaft 6 is constantly connected to the ring gear of the fourth planetary gear set P4 and to the carrier of the third planetary gear set P3, and can be detachably connected to the drive shaft 1 via a clutch 16, the shaft 7 is permanently connected to the sun gears of the third and fourth planetary gear sets P3, P4, and can be coupled to a housing G of the transmission via a brake 07, and the output drive is produced via the output shaft 2 that is permanently connected to the carrier of the fourth planetary gear set P4.

In the example shown, the main gear set comprising the third and fourth planetary gear sets P3, P4 is designed as a Simpson gear set having a common wide sun gear, two carriers, and two ring gears, and the shaft 7 is connected to the common sun gear. As an alternative to the embodiment as a Simpson gear set, the planetary gear sets P3, P4 can be designed as separate gear sets.

Furthermore, the clutch 16 is disposed upstream of the main gear set in the direction of power flow, as viewed axially, thereby resulting in a configuration in the sequence clutch 16, P4, P3, P2, P1.

In the embodiment shown, which is particularly suitable for a front-transverse installation, and in the following examples, the planetary gear sets P1, P2 forming the front-mounted gear set are disposed above one another, as viewed radially, whereby all four planetary gear sets, viewed spatially axially, are advantageously limited to three gear set planes. This arrangement can be implemented in particular if the stationary transmission ratios of the planetary gear sets P1 and P2 are sufficiently small. Within the scope of further embodiments, is it also possible for the planetary gear sets P1, P2 forming the front-mounted gear set to be disposed next to one another, as viewed axially.

Furthermore, as shown in FIG. 1 and in the further figures, the clutch 18 and/or the brake 07 can be designed as form locking shift elements or as claw shift elements, thereby reducing drag torques. The use of form locking shift elements is possible when these shift elements are disengaged only during upshifts, which will be explained with reference to the description of FIG. 4. The further shift elements are preferably designed as friction shift elements. The clutch 18 is preferably disposed between the main gear set and the front-mounted gear set, as viewed axially.

Figure 2:
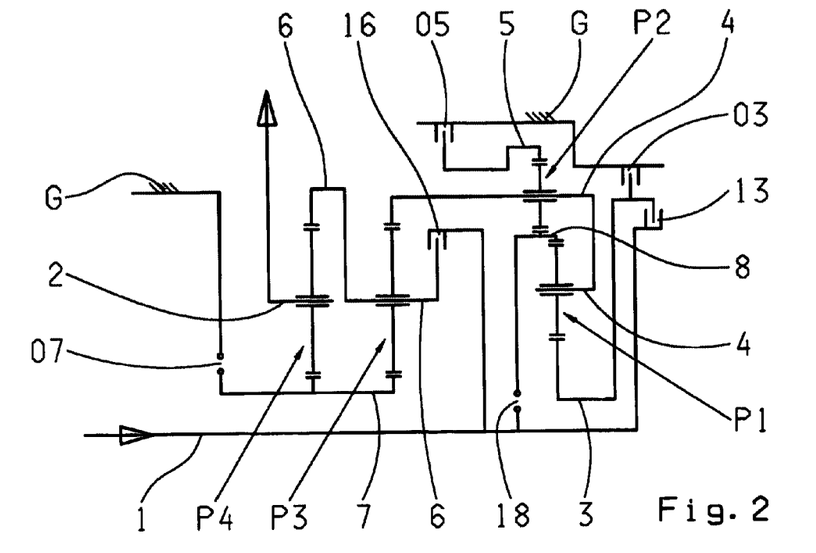
FIG. 2: a schematic view of a further preferred embodiment of a multi-stage transmission according to the invention.

The embodiment shown in FIG. 2 differs from the embodiment shown in FIG. 1 in that the clutch 16, which detachably connects the drive shaft 1 to the shaft 6, is disposed, as viewed axially, between the third and second planetary gear sets or between the main gear set and the front-mounted gear set, thereby advantageously reducing or preventing discernible squeaking noises.

Figure 3:
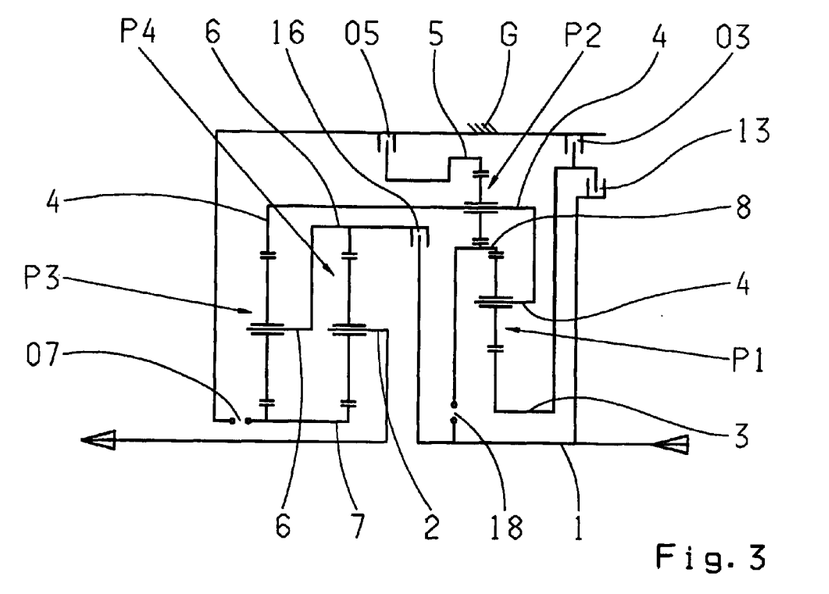
FIG. 3: a schematic view of a third preferred embodiment of a multi-stage transmission according to the invention.

The subject of FIG. 3 is an embodiment that shows a transmission, according to the invention, in a standard design with a coaxial drive shaft and output shaft; the difference from the embodiment shown in FIG. 2 is that the planetary gear sets P3, P4 of the main gear set are disposed in the opposite sequence, thereby resulting in a configuration in the sequence P3, P4, P2, P1, as viewed axially. In this case as well, the clutch 16 is preferably disposed between the main gear set and the front-mounted gear set, as viewed axially.

Figure 4:
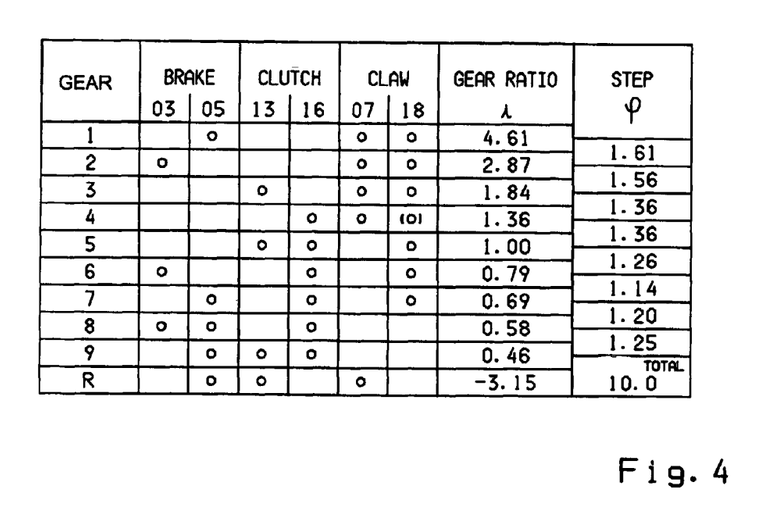
FIG. 4: an example of a shift pattern for a multi-stage transmission according to the FIGS. 1, 2 and 3.

FIG. 4 shows an example of a shift pattern of a multi-stage transmission according to FIGS. 1, 2, and 3, wherein it is assumed that the clutch 18 and the brake 07 are implemented as claw shift elements (i.e. as a claw clutch or claw brake). Three shift elements are engaged for every gear (with the exception of the fourth gear). The shift pattern shows, as examples, the particular transmission ratios i of the individual gear steps, and the gear increments and step changes φ to be determined therefrom.

Typical values for the stationary transmission ratios of the planetary gear sets P1, P2, P3 and P4 are −1.80, −1.50, −2.80 and −2.80, respectively. FIG. 4 shows that double shifting or group shifting is avoided when shifting sequentially since two adjacent gear steps share two shift elements. It is also shown that a large transmission ratio spread is attained with small gear increments.

Furthermore, advantageously, few friction shift elements are disengaged in the main drive gears: for example, in the eighth and ninth gear, only one friction shift element is disengaged, wherein two friction shift elements are not required in the fifth, six and seventh gears. This reduces the drag torques resulting from the short distance between the friction surfaces of a friction shift element in the disengaged state and the oil or air-oil mixture contained therein.

The first gear is attained by engaging the clutch 18 and the brakes 05 and 07, the second gear is attained by engaging the brakes 03 and 07 and the clutch 18, the third gear is attained by engaging the brake 07 and the clutches 13 and 18, and the fourth gear is attained by engaging the brake 07 and the clutch 16. The fourth gear can only be attained by using the main gear set; according to the invention, in the fourth gear, one of the shift elements of the forward-mounted gear set 03, 05, 13, 18 can also be engaged, which then remains unloaded.

In the example shown, claw clutch 18 is selected as representative of the shift elements of the front-mounted gear set as the shift element to be engaged optionally for the fourth gear. In the fourth gear, for example, if the brake 03 is engaged along with the brake 07 and the clutch 16, a downshift is possible from eighth gear to the fourth gear by disengaging one shift element and engaging a further shift element, and the same applies for a downshift from the ninth gear into the fourth gear, if the brake 05 is engaged along with the brake 07 and the clutch 16.

Furthermore, the fifth gear, which is preferably designed as a direct gear, is attained by engaging the clutches 13, 16 and 18, the sixth gear is attained by engaging the brake 03 and the clutches 16 and 18, the seventh gear is attained by engaging the brake 05 and the clutches 16 and 18, the eighth gear is attained by engaging the brakes 03 and 05 and the clutch 16, and the ninth gear is attained by engaging the brake 05 and the clutches 13 and 16. As shown in the shift pattern, the reverse gear is attained by engaging the brakes 05 and 07 and the clutch 13.

Since the brakes 05 and 07 are engaged in the first forward gear and in the reverse gear, these shift elements (designed as friction shift elements) can be used as start-up elements.

Figure 5:
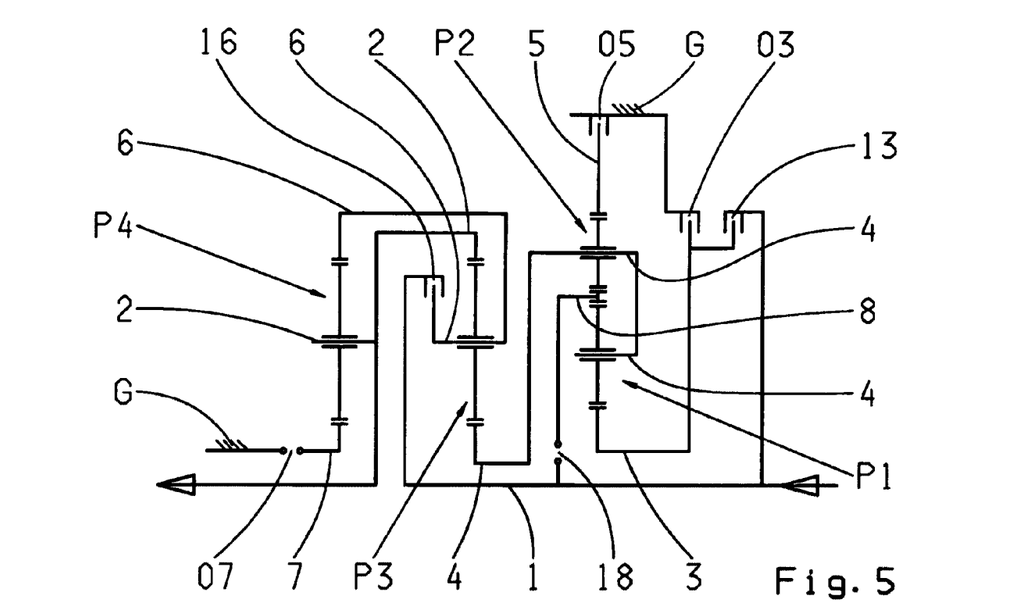
FIG. 5: a schematic view of a further preferred embodiment of a multi-stage transmission according to the invention.

In the embodiment shown in FIG. 5, the front-mounted gear set, which includes planetary gear sets P1 and P2, is designed in accordance with the front-mounted gear set shown in FIGS. 1, 2, and 3, wherein the clutch between the front-mounted gear set and the main gear set, and the clutches of the elements of the main gear set are different. The planetary gear sets, viewed axially, are disposed in the sequence P4, P3, P2, P1.

As shown in FIG. 5, the carriers of the first and the second planetary gear sets P1, P2 are coupled together via the shaft which is connected to the sun gear of the planetary gear set P of the main gear set, and the ring gear of the first planetary gear set P1 is coupled to the sun gear of the second planetary gear set P2 via the shaft 8 which is detachably connectable to the drive shaft via a clutch 18.

Furthermore, the sun gear of the first planetary gear set P1 can be coupled to a housing G of the transmission by means of the shaft 3 via a brake 03, and is detachably connectable to the drive shaft 1 via a clutch 13, and the ring gear of the second planetary gear set P2 can be coupled to a housing G of the transmission by means of the shaft 5 via a brake 05. The clutch 13 and the brake 03 preferably have a common inner lamella carrier.

Furthermore, the shaft 6 is permanently connected to the carrier of the third planetary gear set P3, is connected to the ring gear of the fourth planetary gear set P4, and is detachably connectable to the drive shaft 1 via the clutch 16, and the shaft 7 is permanently connected to the sun gear of the fourth planetary gear set P4, and can be coupled to a housing G of the transmission via the brake 07. In the example shown, the output shaft 2 is permanently connected to the ring gear of the third planetary gear set P3 and the carrier of the fourth planetary gear set P4. In the example shown, the clutch 16 is disposed between the planetary gear sets of the main gear set P3 and P4, as viewed axially.

Figure 6:
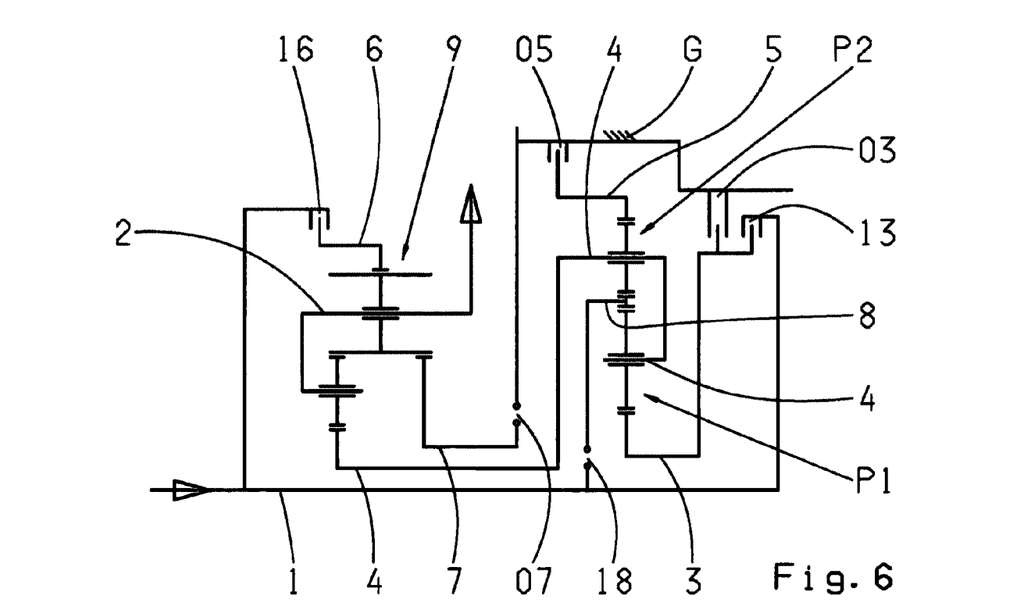
FIG. 6: a schematic view of a fifth preferred embodiment of a multi-stage transmission according to the invention.
Figure 7:
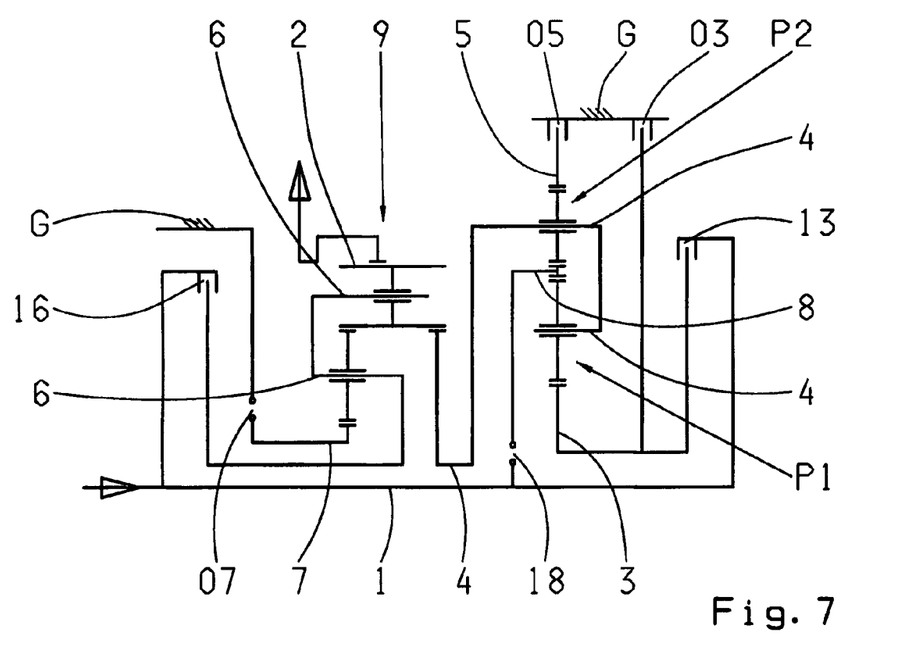
FIG. 7: a schematic view of a sixth preferred embodiment of a multi-stage transmission according to the invention.

According to further embodiments of the invention, which are the subject of FIGS. 6 and 7, the third and fourth planetary gear sets can be combined or reduced to a Ravigneaux set 9 having a common carrier and a common ring gear.

As shown in FIG. 6, the carriers of the first and the second planetary gear sets P1, P2 are coupled together via the shaft 4 which is connected to the first sun gear of the Ravigneaux set 9, and the ring gear of the first planetary gear set P1 is coupled to the sun gear of the second planetary gear set P2 via the shaft 8 which is detachably connectable to the drive shaft via a clutch 18.

Furthermore, the sun gear of the first planetary gear set P1 can be coupled to a housing G of the transmission by means of the shaft 3 via a brake 03, and is detachably connectable to the drive shaft 1 via a clutch 13, and the ring gear of the second planetary gear set P2 can be coupled to a housing G of the transmission by means of the shaft 5 via a brake 05. The clutch 13 and the brake 03 preferably have a common inner lamella carrier.

Furthermore, the shaft 6 is permanently connected to the common ring gear of the Ravigneaux set 9, is detachably connectable to the drive shaft 1 via the clutch 16, and the shaft 7 is permanently connected to the second sun gear of the Ravigneaux set 9, and can be coupled to a housing G of the transmission via the brake 07; the output is produced via the carrier of the Ravigneaux set 9. Furthermore, the brake 07 is disposed between the front-mounted gear set and the Ravigneaux set 9, as viewed axially. In the example shown, the clutch 18 and the brake 07 are disposed between the main gear set and the front-mounted gear set, as viewed axially.

The example shown in FIG. 7 differs from the embodiment shown in FIG. 6 in that the shaft 4 is connected to the second sun gear of the Ravigneaux set 9, and the shaft 6 is connected to the common carrier, and can be detachably connected via the third clutch 16 to the drive shaft 1. In addition, the shaft 7 is connected to the first sun gear of the Ravigneaux set 9, and can be coupled to a housing G of the transmission via the brake 07, and the output drive is produced via the common ring gear of the Ravigneaux set 9.

Figure 8:
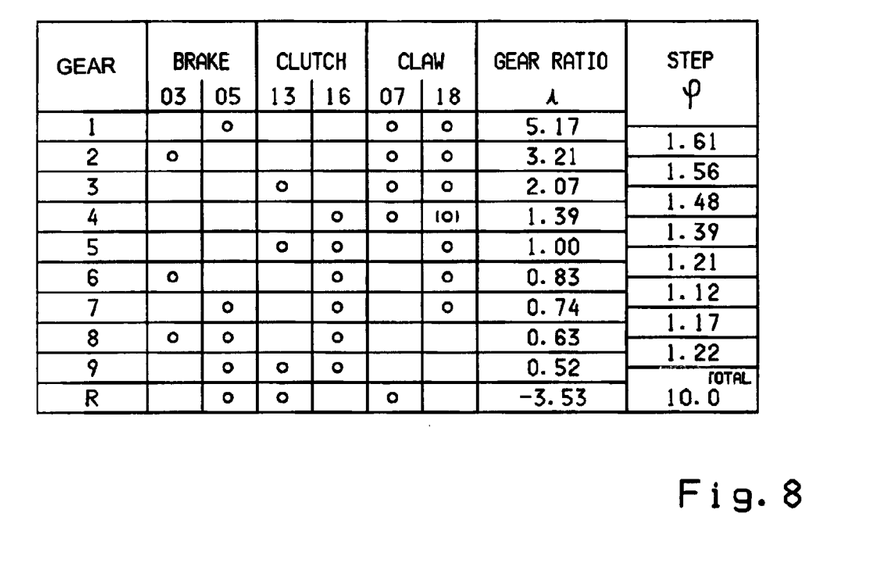
FIG. 8: an example of a shift pattern for a multi-stage transmission according to the FIGS. 5, 6 and 7.

The subject of FIG. 8 is a shift pattern of a multi-stage transmission according to FIGS. 5, 6, and 7, wherein it is assumed that the clutch 18 and the brake 07 are implemented as claw shift elements (i.e. as a claw clutch or claw brake). This shift pattern differs from the shift pattern shown in FIG. 4 in that the stationary transmission ratios of the planetary gear sets P1, P2, P3 and P4, which are used as the basis for calculating the transmission ratios and step changes are −1.80, −1.50, −1.70 and −2.54, respectively; according to FIG. 6, they are −1.80, −1.50, +2.70 and −2.54, respectively, and according to FIG. 7 they are −1.80, −1.50, −1.70 and +3.54, respectively.

According to the invention, different gear increments can also result from the same gear pattern depending on the shift logic, thereby making it possible to realize an application-specific or vehicle-specific variation.

It is also possible to provide additional freewheels at each suitable location of the multi-stage transmission, for example, between a shaft and the housing, or possibly to connect two shafts.

According to the invention, an axle differential and/or a distributor differential can be disposed on the drive side or on the output side.

Within the scope of an advantageous development, the drive shaft 1 can be separated from a drive motor, as needed, by a clutch element, wherein a hydrodynamic converter, a hydraulic clutch, a dry start-up clutch, a wet start-up clutch, a magnetic powder clutch, or a centrifugal clutch can be used as the clutch element. It is also possible to dispose such a start-up element in the power flow direction after the transmission wherein, in this case, the drive shaft 1 is continuously connected to the crankshaft of the engine.

The multi-stage transmission, according to the invention, also makes it possible to situate a torsional-vibration damper between the engine and the transmission.

Within the scope of a further embodiment of the invention, which is not shown, a wear-free brake, for instance, a hydraulic or electric retarder or the like, can be disposed on each shaft, preferably on the drive shaft 1 or the output shaft 2, which is of special significance for use in commercial vehicles in particular. Furthermore, a power take-off drive can be provided on each shaft, preferably on the drive shaft 1 or the output shaft 2, for driving additional assemblies.

The friction shift elements that are used can be designed as power shiftable clutches or brakes. In particular, force locking clutches or brakes can be used, for instance, lamellar clutches, band brakes, and/or cone clutches.

A further advantage of the multi-stage transmission presented here is that an electric machine can be attached to each shaft as a generator and/or as an additional drive machine.

Obviously, any structural embodiment, in particular any spatial disposition of the planetary gear sets and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS

1 Shaft
2 Output shaft
3 Shaft
4 Shaft
5 Shaft
6 Shaft
7 Shaft
8 Shaft
9 Ravigneaux set
03 Brake
05 Brake
07 Brake
13 Clutch
16 Clutch
18 Clutch
P1 Planetary gear set
P2 Planetary gear set
P3 planetary gear set
P4 planetary gear set
i Transmission ratio
φ Step change
G Housing

The invention claimed is:

1. A multi-stage transmission of a planetary design for an automatic transmission of a motor vehicle, the multi step transmission comprising:
   a drive shaft (1) and an output shaft (2) which are disposed in a transmission housing (G);
   first, second, third and fourth planetary gear sets (P1, P2, P3, P4), each of the first, the second, the third, and the fourth planetary gear sets (P1, P2, P3, P4) comprising a sun gear, a carrier and a ring gear;
   a third rotatable shaft (3), a fourth rotatable shaft (4), a fifth rotatable shaft (5), a sixth rotatable shaft (6), a seventh rotatable shaft (7) and at least one eighth rotatable shaft (8);
   at least six shift elements (03, 05, 07, 13, 16, 18) comprising a first brake (03), a second brake (05), a third brake (07), a first clutch (13), a second clutch (16), and a third clutch (18) whose selected engagement produces different transmission ratios between the drive shaft (1) and the output shaft (2) such that nine forward gears and a reverse gear can be achieved;
   the first and the second planetary gear sets (P1, P2) form a shiftable front-mounted gear set, and the third and the fourth planetary gear sets (P3, P4) form a main gear set;
   wherein the ring gear of the second planetary gear set (P2) is connectable to the housing (G) of the transmission by the fifth shaft (5) via the second brake (05);
   the seventh shaft (7) is connected to at least one element of the main gear set, and is connectable to the housing (G) of the transmission via the third brake (07);
   the sixth shaft (6) is connected to at least one further element of the main gear set, and is connectable to the drive shaft (1) via the second clutch (16);
   the output shaft (2) is connected to at least one other element of the main gear set;
   the front-mounted gear set is shiftable;
   the carriers of the first and the second planetary gear sets (P1, P2) are coupled together via the fourth shaft (4) which is connected to an additional element of the main gear set;
   the ring gear of the first planetary gear set (P1) is coupled to the sun gear of the second planetary gear set (P2) via the eighth shaft (8) which is connectable to the drive shaft (1) via the third clutch (18); and
   the sun gear of the first planetary gear set (P1) is connectable to the housing (G) of the transmission by the third shaft (3), via the first brake (03), and the third shaft (3) is connectable to the drive shaft (1) via the first clutch (13).

2. The multi-stage transmission according to claim 1, wherein the fourth shaft (4) is connected to the ring gear of the third planetary gear set (P3);
   the sixth shaft (6) is connected to the ring gear of the fourth planetary gear set (P4) and the carrier of the third planetary gear set (P3), and the sixth shaft (6) is connectable to the drive shaft (1) via the second clutch (16);
   the seventh shaft (7) is connected to the sun gears of the third and the fourth planetary gear sets (P3, P4), and the sixth shaft (6) is connected is connectable to the housing (G) of the transmission via the third brake (07); and
   the output shaft (2) is connected to the carrier of the fourth planetary gear set (P4).

3. The multi-stage transmission according to claim 2, wherein the main gear set is a Simpson gear set comprising the third and the fourth planetary gear sets (P3, P4) having a common sun gear, two carriers, and two ring gears, and the seventh shaft (7) is connected to the common sun gear.

4. The multi-stage transmission according to claim 2, wherein the second clutch (16), when viewed axially, is located upstream of the main gear set in a power flow direction.

5. The multi-stage transmission according to claim 2, wherein the second clutch (16), when viewed axially, is located between the main gear set and the front-mounted gear set.

6. The multi-stage transmission according to claim 1, wherein the fourth shaft (4) is connected to the sun gear of the third planetary gear set (P3);
the sixth shaft (6) is connected to the carrier of the third planetary gear set (P3) and to the ring gear of the fourth planetary gear set (P4), and the sixth shaft (6) is connectable to the drive shaft (1) via the second clutch (16);
the seventh shaft (7) is connected to the sun gear of the fourth planetary gear set (P4), and the seventh shaft (7) is connectable to the housing (G) of the transmission via the third brake (07); and
the output shaft (2) is connected to the ring gear of the third planetary gear set (P3) and the carrier of the fourth planetary gear set (P4).

7. The multi-stage transmission according to claim 6, wherein the second clutch (16), when viewed axially, is located between the third and the fourth planetary gear sets (P3, P4) of the main gear set.

8. The multi-stage transmission according to claim 1, wherein the third and the fourth planetary gear sets (P3, P4) are one of combined and reduced to a Ravigneaux set (9) having a common carrier and a common ring gear;
the fourth shaft (4) is connected to a first sun gear of the Ravigneaux set (9);
the sixth shaft (6) is connected to the common ring gear of the Ravigneaux set (9), and is connectable via the second clutch (16) to the drive shaft (1);
the seventh shaft (7) is connected to a second sun gear of the Ravigneaux set (9), and the seventh shaft (7) is connectable to the housing (G) of the transmission via the third brake (07), and output drive is achieved via the carrier of the Ravigneaux set (9).

9. The multi-stage transmission according to claim 1, wherein the third and the fourth planetary gear sets (P3, P4) are combined to a Ravigneaux set (9) having a common carrier and a common ring gear;
the fourth shaft (4) is connected to a second sun gear of the Ravigneaux set (9);
the sixth shaft (6) is connected to the common carrier of the Ravigneaux set (9), and is connectable to the drive shaft (1) via the second clutch (16);
the seventh shaft (7) is connected to a first sun gear of the Ravigneaux set (9), and the seventh shaft (7) is connectable to the housing (G) of the transmission via the third brake (07); and
output drive is achieved via the common ring gear of the Ravigneaux set (9).

10. The multi-stage transmission according to claim 1, wherein at least one of the third clutch (18) and the third brake (07) is a claw shift element, and the first and the second clutches (13, 16) and the first and the second brakes (03, 05) are friction elements.

11. The multi-stage transmission according to claim 1, wherein a first gear is achieved by engagement of the third clutch (18) and the second and the third brakes (05, 07);
a second gear is achieved by engagement of the first and the third brakes (03, 07) and the third clutch (18);
a third gear is achieved by engagement of the third brake (07) and the first and the third clutches (13, 18);
a fourth gear is achieved by engagement of at least the third brake (07) and the second clutch (16);
a fifth gear is achieved by engagement of the first, the second and the third clutches (13, 16, 18);
a sixth gear is achieved by engagement of the first brake (03) and the second and the third clutches (16, 18);
a seventh gear is achieved by engagement of the second brake (05) and the second and the third clutches (16, 18);
an eighth gear is achieved by engagement of the first and the second brakes (03, 05) and the second clutch (16); and
a ninth gear is achieved by engagement of the second brake (05) and the first and the second clutches (13, 16).

12. The multi-stage transmission according to claim 1, wherein the reverse gear is achieved by engagement of the second and the third brakes (05, 07) and the first clutch (13).

13. The multi-stage transmission according to claim 1, wherein the first and the second planetary gear sets (P1, P2), which form the forward-mounted gear set, are arranged concentric with one another, when viewed axially so that the first, the second, the third and the fourth planetary gear sets (P1, P2, P3, P4) are arranged in three gear set planes, when viewed spatially axially.

14. The multi-stage transmission according to claim 1, wherein the first clutch (13) and the first brake (03) have a common inner lamella carrier.

* * * * *